Dec. 1, 1959 E. W. DAUGHERTY 2,915,584

METHOD OF AND APPARATUS FOR RECORDING TELEVISION SIGNALS

Filed March 19, 1956 9 Sheets-Sheet 1

INVENTOR.
EARL WILLIAM DAUGHERTY by Ernest G. Montague

ATTORNEY

INVENTOR.
EARL WILLIAM DAUGHERTY
by [signature]
ATTORNEY

INVENTOR.
EARL WILLIAM DAUGHERTY
by [signature]
ATTORNEY

INVENTOR.
EARL WILLIAM DAUGHERTY
by [signature]
ATTORNEY

Dec. 1, 1959 E. W. DAUGHERTY 2,915,584

METHOD OF AND APPARATUS FOR RECORDING TELEVISION SIGNALS

Filed March 19, 1956 9 Sheets-Sheet 5

INVENTOR.

EARL WILLIAM DAUGHERTY by [signature]

ATTORNEY

INVENTOR.
EARL WILLIAM DAUGHERTY
by Ernest G. Montague
ATTORNEY

AMPLIFIER POWER SUPPLY

INVENTOR.
EARL WILLIAM DAUGHERTY by [signature]

ATTORNEY

Dec. 1, 1959 E. W. DAUGHERTY 2,915,584

METHOD OF AND APPARATUS FOR RECORDING TELEVISION SIGNALS

Filed March 19, 1956 9 Sheets-Sheet 8

INVENTOR.
EARL WILLIAM DAUGHERTY
by
ATTORNEY

INVENTOR.
EARL WILLIAM DAUGHERTY
by [signature]
ATTORNEY 2,915,584

METHOD OF AND APPARATUS FOR RECORDING TELEVISION SIGNALS

Earl William Daugherty, Broad Channel, N.Y., assignor to Yvonne Daugherty, Broad Channel, N.Y.

Application March 19, 1956, Serial No. 572,306

12 Claims. (Cl. 178—7.4)

The present invention relates to a method of and apparatus for recording television signals in general and to a method of and apparatus for producing visual and audible records of television signals in particular.

The present invention concerns itself particularly also with the method and apparatus which is adapted to record the images of a television screen which receives its video signal either through a monitor circuit connected into a transmitter circuit or which is incorporated in a television receiver.

It has been proposed before to produce such television transcriptions which operated with mechanical shutters or with electronic shutters, which used, however, methods which had certain inherent disadvantages and did not bring about satisfactory results. Many of these disadvantages arise from the particular scansion frequencies and patterns employed at the present time in television broadcasting.

It is almost conventional practice in television broadcasting at the present time to transmit the video signal at the rate of thirty frames per second, each of said frames consisting of a pair of interlaced "scans" or "fields" or also at the rate of sixty frames per second in case of non-interlaced scanning of the screen. The frame rate of thirty and sixty, respectively, is selected because of its commensurability with the usual sixty-cycle alternaing current electric power frequency. It may be noted at this point that in most European countries the standard electric power frequency is fifty cycles per second, and accordingly, the frame rate of television apparatus in most European countries is twenty-five instead of thirty.

Inasmuch as each of the interlaced scans or fields consumes a time of approximately one-half of the single frame, the scans or frames in the American system occur at the rate of sixty per second. Each individual interlaced scan comprises a number of horizontal lines which are spaced vertically by a distance twice that which appears between lines in the final television frame. The individual scans are so placed on the screen that lines of one scan fall between the lines of the other scan, making up a single frame. Due to the persistency of human vision and also the persistency of the cathode-ray screen in the television receiver, the interlaced lines fuse or blend into a single frame picture having closely spaced horizontal lines of twice the number appearing in any individual scan. Actually, while the duration of a single scan will usually be referred to herein as $1/60$ of a second, the duration is slightly less than $1/60$ of a second by reason of the so-called "blanking" period which elapses between each successive pair of frames in a television video signal. The purpose of the blanking period is to darken the screen momentarily during the return of the cathode-ray spot to its initial position in the upper left hand corner to start the next scan, and also to transmit certain other synchronizing signals connected with the synchronizing of successive scans.

The diffilulties which arise in attempting to make a permanent record of television programs result from the difference in the scansion rate of standard sound motion picture apparatus and that of television equipment. The standard rate for sound motion pictures has been established at twenty-four frames per second. Practically all cameras and projectors are designed to operate at this rate and while they are often adjustable, they do not provide a range of adjustment sufficiently great to provide for the difference between twenty-four frames per second and thirty frames per second as used in television apparatus. It may be stated at this point again that in European countries twenty-four frames per second is also the standard rate for motion picture equipment, but the difference in frame rate between twenty-four and twenty-five does not produce a noticeable difference in the quality of either a visual or sound record. Accordingly, the difference in frame rate is not as serious in European countries as encountered with the American system.

In order to solve this problem, an attempt has been made to construct a motion picture camera which operates at thirty frames per second, and to synchronize the operation thereof with the frame rate of a television receiver, whereby to reproduce on film one motion picture frame corresponding to each television frame. Such film could be projected only through a special projector at the rate of thirty frames per second. This attempted solution has been discarded, however, because a substantially greater amount of film is required than is necessary for satisfactory motion picture quality, and because such films would not have universal utility in view of the requirement of special equipment for projection.

Another and even more serious difficulty arises, however, in the photographing of television screen images which is due to the nature of the production of the television frame picture on the cathode-ray screen which is different from the intermittent exposure of motion picture frames. It is quite apparent that because of the fact that the television picture is progressively swept onto the screen as the cathode-ray spot progresses downwardly across the face of the screen, a reduction in the length of exposure when photographing the screen results not in a reduction of intensity of the recorded photographic image, but in deletion of some of the scansion lines. If for instance the shutter of a motion picture camera photographing a television screen is opened exactly at the beginning of a particular television frame, but is closed prior to the end of said frame period, the scansion lines in a lower portion of the photographic image will be omitted. Due to the fact that the standard television frame consists of two successive scans or fields in case of interlaced scansion, yet of one single field in case of non-interlaced scansion, the photographic image produced by an exposure which is longer than $1/60$ of a second but shorter than $1/30$ of a second has a stripe of markedly reduced intensity across the lower portion of the picture, the image appearing within such stripe consisting of only the alternate lines of the initial scan or field.

Accordingly, it was the general belief that not only must the frame rate of the motion picture cameras correspond to that of the television frame rate, but exposure time must be such that during the open period of the shutter, the scansion spot can completely cover the picture area.

The conventional motion picture camera produces one exposure every $1/24$ of a second. Approximately one-half the period of time between one frame and the next is used up, however, in moving the film from one position to the next. Obviously, during the time that the film is moved, the shutter must be closed to avoid blurring the photographic image.

One compromise solution to the two above problems, namely the differential frame rate and exposure, is to run the camera at twenty-four frames per second and make each "open shutter" period $1/30$ of a second. It can readily be seen that such a procedure leaves 1/24–1/30, or 1/120 of a second in which to move the film. This 1/120 of a second "pull-down" period must be shortened even more by reason of the fact that certain periods are required for the shutter to close and to open. This arrangement led to an extremely short "pull-down" period which brought about additional disadvantages.

Still another difficulty encountered in previous attempts at television transcription lies in the fact that when a camera frame rate of twenty-four frames per second is employed, each successive exposure of the film begins at a different line in the television frame. If, for instance, the exposure time is 1/30 of a second, and the film rate is twenty-four frames per second, it may be assumed that the first film exposure commences at a time when the scanning spot is just beginning its downward path across the television screen. The first film exposure being 1/30 of a second will include exactly one television frame, and the scansion spot will have just completed the last scan at the time the shutter closes. The shutter will then remain closed for a period of 1/120 of a second and will hereupon open to begin the exposure of the next successive frame on the film. Thus, it will be seen that the second exposure of the film will begin at a time when 1/120 of a second of the television frame then in progress has already elapsed. This means that the scanning spot is half way down the screen in the first scan when the shutter opens. Theoretically, this situation may possibly be considered cured by the fact that at the end of the second film exposure the spot will again be half way down the screen, whereby to fill in the "gap" which resulted from starting the film exposure at a time part way through the television frame.

A perfect matching of the various scan portions which make up each successive photographic image will result, however, only when the exposure time is exactly maintained. If, for instance, the exposure time is very slightly less than 1/30 of a second, a distinctly defined area of the resultant photographic image will be underexposed by a factor of 1/2. If such error in the exposure time is recurring, that is continuous throughout the progress of the photography, a very disturbing horizontal bar will be produced in the final film which effect is generally referred to as "shutter bar."

It is, therefore, one object of the present invention to provide a method of and apparatus for recording television programs which includes means designed to eliminate the effect of a "shutter bar."

It is another object of the present invention to provide a method of recording television programs in which due to the use of a phosphor of medium persistence characteristics, especially when an interlaced pattern is to be recorded, consisting of two fields interlaced to form one frame, a camera exposure time of 1/60 of a second, by example, is made possible and still record a very high percentage of all the material appearing on the screen of the cathode-ray tube.

It is still another object of the present invention to provide a method of recording television programs in which the last field scanned prior to the opening of the camera shutter remains on the face of the cathode-ray tube by persistence of the phosphor and is recorded on the film, while the field being scanned during 1/60 of a second interval during which the shutter of the camera is open, thus making possible the recording of one complete frame requiring 1/30 of a second for the scanner to complete its work in just 1/60 of a second of camera exposure time.

It is a further object of the present invention to provide a method of recording television programs in which a saw tooth wave form is introduced into the beam current of the cathode-ray tube mechanically locked into the camera mechanism and, thereby synchronized with the camera, so as to increase the desirable characteristics of persistence in the phosphor.

It is yet a further object of the present invention to provide a method of recording television programs in which the film is subjected to an even, filtered light immediately prior to its exposure, the light intensity of said filtered light being in direct relation with the gamma characteristics of the film to be used in the camera.

It is still another object of the present invention to provide an apparatus for recording television programs which comprises a camera shutter designed as a revolving about, half-circular disc and means for rotating the shutter at a predetermined speed, for instance, 1800 r.p.m. for one and one-half revolutions thereof and then to slow down the number of revolutions of said shutter to about half of said predetermined speed to, for instance, an average of 900 r.p.m. during the next one-half revolution and then to repeat the cycle again.

It is also a further object of the present invention to provide a method of recording television programs according to which the camera shutter is subjected intermittently to greater and smaller speeds, respectively, in order to arrive at a rate of twenty-four frames per second in the camera with an exposure time of 1/60 of a second of each frame and a blank-out and pull-down time of 1/60 or 1/30 of a second between frames. Such arrangement avoids the necessity of splicing pictures appearing on the cathode-ray tube, resulting in the objectionable effect shown as video splice or "shutter bar," as stated above.

It is also a particular object of the present invention to provide an apparatus for recording television programs in which the electric power in the camera is so modified that the motor case together with its coils may be rotated in the motor mount, thus changing the position of the synchronizing points in relation to the camera mechanism while the camera is operating. A viewer having a shutter turning in synchronization with the shutter of the camera permits the phase change required to remove the "shutter bar."

It is a further important object of the present invention to provide an apparatus for recording television programs which includes an amplifier designed to furnish current for the camera motor, where the transmitted signal is generated by a power source not interlocked with the source powering the recording equipment and which, therefore, may vary slightly in cycles per second. This amplifier uses the vertical deflection signal from the monitor and converts it to a sine wave of 115 volts A.C. and thus furnishes power to the motor at the same cycle rate as the source powering the transmitter of the signal to be recorded.

With these and other objects in view which will become apparent in the following detailed description, the present invention will be clearly understood in connection with the accompanying drawings, in which.

Figure 1:
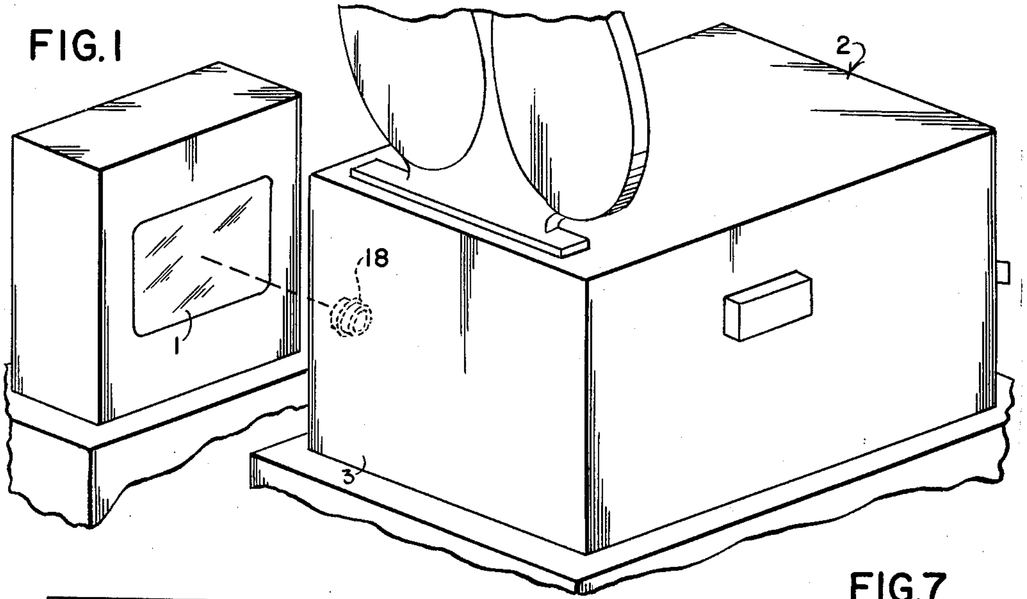
Figure 1 is a perspective front elevation of a television receiver disposed opposite a camera recording unit.
Figure 7:
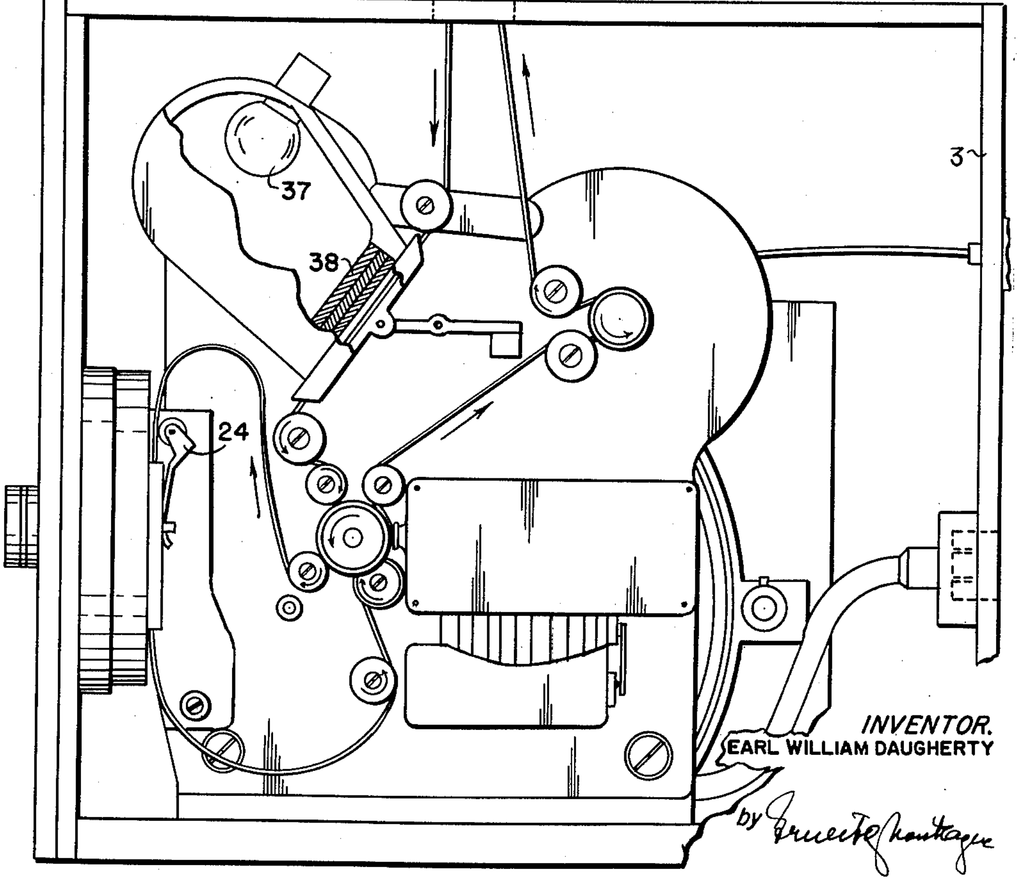
Fig. 7 is a side elevation of the camera mechanism.

The present invention is based on the principle that a film exposure of a duration of 1/60 of a second is provided, that means for the duration of one scan or field only of the television screen in case of interlaced scansion or of one frame in case of non-interlaced scansion. It is to be understood that speaking of a "scan unit," such "scan unit" means a scan in interlaced scansion and a frame in non-interlaced scansion. This comparatively short film exposure allows for a relatively long film pull-down time in the camera mechanism and in addition it is also made possible to easily synchronize the opening and closing of the camera shutter with the starting and stopping of the frame scanning on the cathode-ray tube, even though the camera is operating at twenty four frames per second and the scanner on the cathode-ray tube at thirty or sixty frames per second depending whether an interlaced or non-interlaced frame is produced on the cathode-ray tube.

In order to permit an exposure time of 1/60 of a second for the film in spite of the fact that a complete "scan unit" of the television screen requires 1/30 of a second for interlaced scanning, it is one of the principles of the present invention to use a phosphor of medium persistence characteristics, in particular when an interlaced pattern is to be recorded which consists of two fields interlaced to form one frame. The persistence of the phosphor is preferably chosen to operate in such manner that the maximum brilliance after excitation is reduced to about 7 percent of said maximum brilliance within a limit of approximately 1/30 of a second. It is also preferable to use such phosphor which brings about a very even and continuous drop in the decay of light emission. Such phosphor entirely satisfactory for performing the present method is known in the trade as P–4. By using a phosphor of these mentioned characteristics it becomes possible to use a camera exposure time of 1/60 of a second and still record a very high percentage of all the material appearing on the cathode-ray tube.

The principle on which the present invention is based permits a recording of the television screen in such manner that the last field scanned prior to the opening of the camera shutter remains on the face of the cathode-ray tube by persistence of the phosphor and is recorded on the film, while the field is scanned during 1/60 of a second during which the shutter of the camera is open. Thus, the present method permits the recording of one complete frame requiring 1/30 of a second for the scanner to complete its work in case of interlaced scansion in just 1/60 of a second of camera exposure time, namely one-half of the scanning during its actual working and the other half due to the persistence characteristics of the phosphor applied to the television screen.

It has been found that by using this principle and devising a method according to which the thirty frames per second of the video signal are coordinated to the twenty-four frames per second of the film speed in such manner that no "shutter bar" can possibly appear on the film because the film exposure times coincide exactly with the first or second scan of each frame or the entire frame of the video signal.

Figure 2:
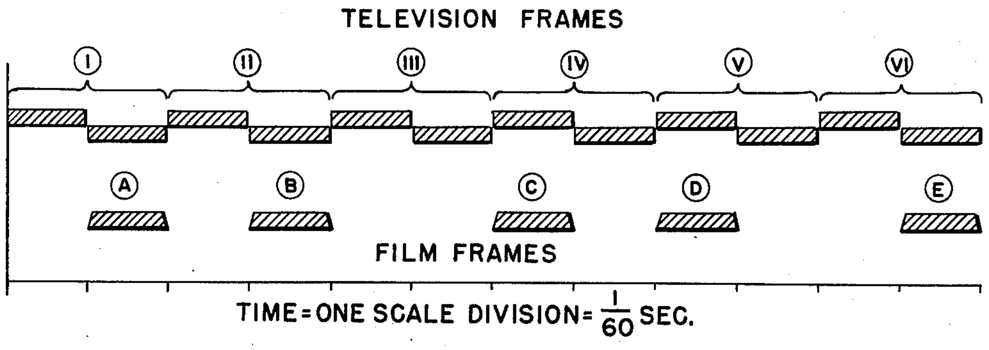
Fig. 2 is a graphic representation of the coordination of television frames and film frames according to the method of the present invention.
Figure 3:
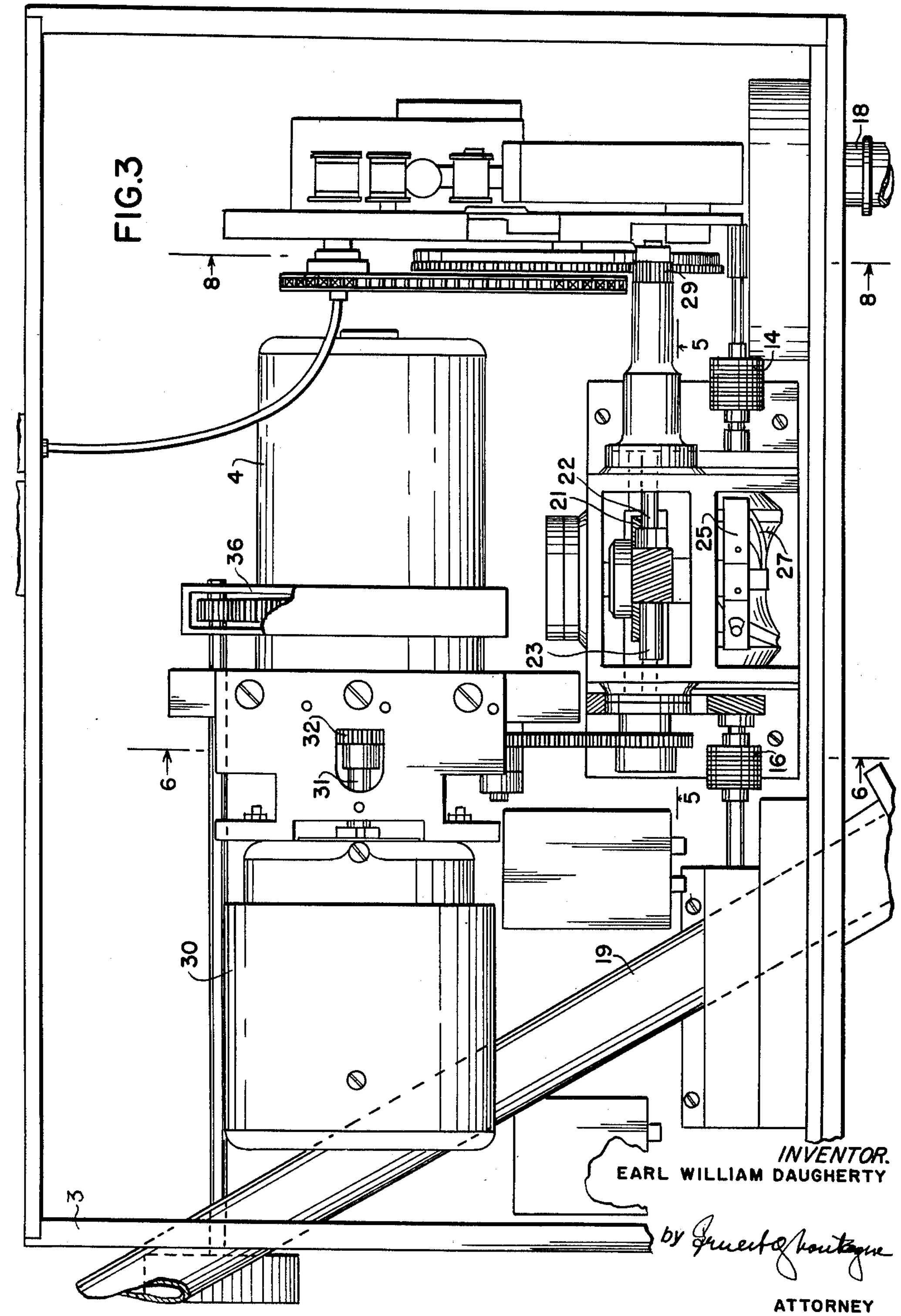
Fig. 3 is a top plan view of the driving mechanism for the shutters and for the camera feed.
Figure 4:
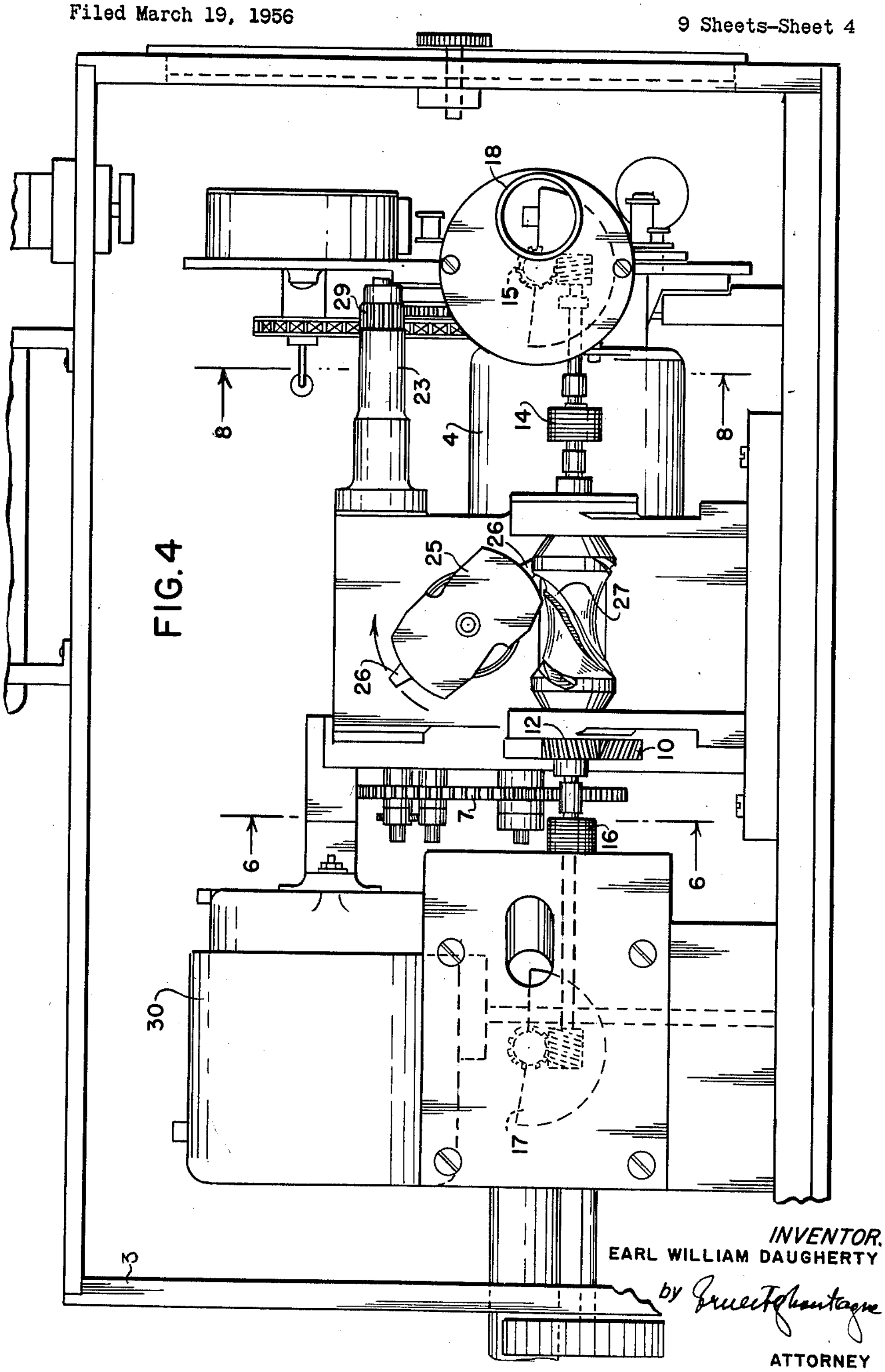
Fig. 4 is a front elevation of the mechanism shown in Fig. 3.

Referring now to Fig. 2 of the drawing, in the upper portion of Fig. 2 the successive scans appearing on the television screen are indicated by offset horizontal bars, the length of the bar indicating the duration of the scansion period. Pairs of scans which make up a single television frame for interlaced scansion and two frames for non-interlaced scansion are bracketed and the successive frames are indicated by Roman numerals.

In the lower portion of Fig. 2, the open periods of the shutter in the camera are indicated by horizontal bars designated A, B, C, D, etc. It will be seen that the frame A is coincident with the second television scan or second television frame in the scanning period I, that film frame B is coincident with the second television scan or second television frame in the scanning period II, that during the entire scanning period III the shutter of the camera prevents exposure of the film. The next film frame exposing the film is coincident with the first television scan or first television frame of the scanning period IV, the film frame D is coincident with the first television scan or first television frame of the scanning period V, whereupon again for two scanning periods, namely during the second television scan or second television frame of the scanning period V and during the first television scan or first television frame of the scanning period VI, the film of the camera remains unexposed. The next film frame E coincides with the second television scan or second television frame of the scanning period VI and thus starts a new cycle, since the film frame E is in the same position in television frame VI as the film frame A in relation to the television frame I.

Since the method of the present invention as demonstrated in Fig. 2 is the basis of the novel principle, this method will be further explained in relation to the scanning position on the cathode-ray tube. As demonstrated in Fig. 2 of the drawing, the first field or the first frame is scanned while the camera shutter is closed. Upon completion of the first field or of the first frame the scan moves to the top of the picture and scans the second field which will be interlaced with the first field just previously scanned, in case of interlaced scansion. These two scanned fields together form one frame as television is now used for commercial broadcast purposes. When the scan beam starts the scanning of the second field just described, the shutter of the camera opens and remains open during the entire scanning time of the second field which is approximately 1/60 of a second. During this period in which the shutter is open while the second field was scanned, the first field just preceding the second field remains on the screen due to the persistence characteristics of the phosphor used in accordance with the present invention, and thus allows the recording of said first field on the camera simultaneously with the recording of the second field during the scanning of the latter, thereby enabling a complete recording of one frame of the television picture, namely, of the first as well as of the second field, so that both said fields are recorded during the interval of time of scanning one field. The shutter is then closed at the completion of the scanned second field for 1/60 of a second, that means during the scanning of the first field of the following frame, to be opened again during the scanning of the second field of said following frame and to be closed now for an interval of 1/30 of a second, that means during the entire period in which the third frame is scanned on the television picture, thus causing the dropping of an entire frame of television picture formation. The shutter is then opened again for 1/60 of a second at the beginning of the scanning of the first field of the fourth frame coinciding with the scan beam starting at the top of the field and closing again at the end of the scanning period for the first field of the fourth frame which has a duration of 1/60 of a second. The shutter remains closed during the scanning of the second field of the fourth frame for a period of 1/60 of a second and opens again at the beginning of the scanning of the first field of the fifth frame of the television picture, to be closed again for an interval of 1/30 of a second, that means for the time in which the second field of the fifth television frame is scanned as well as during the time in which the first field of the sixth frame is scanned. At this time a cycle is completed and the shutter opens again at the beginning of the scanning of the second field of the sixth frame which is exactly the position of exposing the film during the scanning of the second field of the first frame. This arrangement results as far as the shutter is concerned in even intervals of exposure time, when the shutter is open, but alternating intervals of approximately 1/60 of a second and approximately 1/30 of a second of closure time of the shutter. In other words the open shutter time intervals are always 1/60 of a second, while the closed shutter intervals alternate with 1/60 of a second and 1/30 of a second continuously. The dependence of the mentioned time intervals is in direct relation with the accuracy of the television signal maintaining itself at a rate of sixty cycles exactly. If the television signal departs from an exact sixty cycle rate of speed, due to the fact that the camera synchronous motor and operation is controlled by the operation of the vertical deflection of the television camera, the camera mechanism will follow any departure of speed from the exact sixty cycle and consequently stay in phase with the video signal.

In order to maintain the phase of the video signal with the camera mechanism a saw toothed wave form is introduced into the beam current of the cathode-ray tube (Fig. 13) which is mechanically locked into the camera mechanism and, thereby synchronized with the camera and this arrangement increases the desirable characteristics of persistence in the phosphor as follows. The field just preceding the opening of the camera shutter has the greatest brightness as the scanner starts its scan and gradually diminishes in intensity line by line as the scanner moves through the field, to drop then to a lower value. Yet, as the scanner starts to scan the second field as the camera shutter opens and continues to mount in intensity line by line as the second field is scanned, an even exposure of the lines about the fields during 1/60 of a second exposure time by the camera is presented. This result is caused by the balancing of two factors; one, by the brilliance of the particular line under consideration, and two, by the time such line is before the lens with respect to every other line of the frame being recorded. The creation of said saw toothed wave form may be obtained by any conventional means, as by means, for instance of a transparent track on a circular disc rotated by the camera mechanism through which a light is projected upon a photo-cell creating the twenty-four cycle saw tooth wave form of alternating current, which, after suitable amplification, is applied to the cathode-ray tube.

In order to bring about the effect of alternately closing the shutter for a time interval of 1/30 of a second and 1/60 of a second, either properly designed electronic shutters or mechanical shutters may be used. While mechanical shutters of different suitable structure may be used to achieve the result aimed at by the present invention, one mechanical device will be now described by example which is capable of performing in such manner that the shutter is open for time intervals of 1/60 of a second and shut alternately for 1/30 of a second and 1/60 of a second, respectively.

Referring now to the drawings, and in particular to Figs. 1 and 3 to 9, the recording equipment comprises a cathode-ray tube 1 or kinescope tube such as a radar screen, a television receiver, etc., which may be fed by closed circuit or by signals and a camera recording unit 2. As clearly seen in Figs. 3 and 6, the camera recording unit 2 is properly mounted in a housing 3 and comprises a synchronous motor 4, the shaft 5 of which carries a pinion gear 6. The latter meshes with an idler gear 7 which is adapted to drive a shutter timing gear assembly.

The shutter timing gear assembly comprises a gear 8 meshing with the idler gear 7 and mounted on the shaft 9 to which is also keyed an interlocking gear 10 having teeth for a predetermined amount of its periphery only. The interlocking gear meshes with a driven gear 11 mounted on a shaft 12, the driven gear turning intermittently, that means only for those time intervals while it is in mesh with the teeth of the interlocking gear 10. The shaft 12 carries a cam 13, to be described in more detail below, and drives over a suitable coupling member 14 the shutter 15 at one of its ends and over a suitable coupling member 16 a second shutter 17 at the other of its ends, the shutter 15 rotating in front of the lens 18 of the camera recording unit 2 and the shutter 17 in front of a viewer 19.

The shaft 9 has mounted thereon a helical gear 20 which meshes with a gear 21 meshing in turn diametrically opposite a second helical gear 22. The gear 21 is mounted on a cross shaft 23.

It is, of course, important to provide a variation of speed for the shutters 15 and 17 as well as for the pull-down mechanism 24 operated by the shaft 12. The speed of the pinion gear 6 is transformed in such manner that the shaft 23 turns at 720 r.p.m. The shaft 12 projects from the gear box and carries an additional gear 25 which operates, however, with two teeth 26 only which are 180° apart. The cam 13 is formed as an hourglass-shaped drum and is equipped with a helix 27 through which the teeth 26 of the gear 25 pass at alternate intervals. The helix 27 is designed to reduce the speed of the shaft 12 from normally 1800 r.p.m. to an average of 900 r.p.m. during one-half revolution thereof and back to 1800 r.p.m. as the tooth 26 leaves the helix 27. Thus the drive is so calculated that the rotation of the drum and of the shaft 12 controlling the shutters 15 and 17 and of the pull-down mechanism 24 from 1800 r.p.m. through a time interval causing the shaft to rotate at 900 r.p.m. for one-half revolution while a tooth 26 is engaged in the helix 27 and to rotate at 1800 r.p.m. for one and one-half revolutions while the tooth 26 is not engaged in the helix 27, thereby bringing about alternate closing of the shutters 15 and 17 for 1/30 of a second and 1/60 of a second, respectively. The interlocking gear 10 is designed preferably as a forty-five tooth gear from which a sufficient number of teeth, preferably twenty, have been removed, while the gear 11 is preferably designed as a eighteen tooth gear which will go out of mesh with the interlocking gear 10 as it starts to slow down and will come back in mesh again when the eighteen tooth gear returns to 1800 r.p.m. if the tooth 26 of the gear 25 is not engaged with the helix 27.

Figures 5, 9:
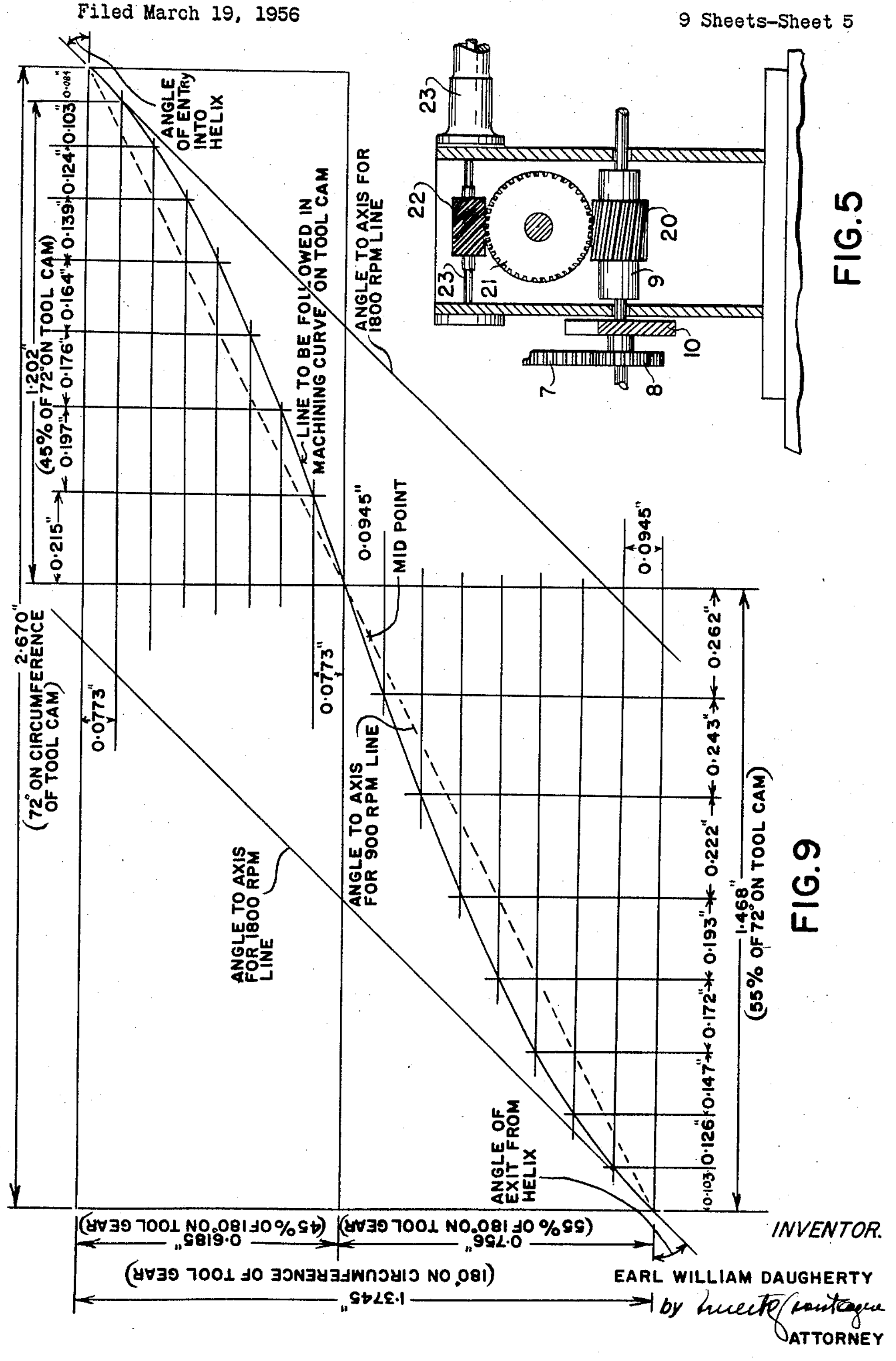
Fig. 5 is a section along the lines 5—5 of Fig. 3.
Fig. 9 is a schematic diagram of the tool cam helix curve.
Figure 6:
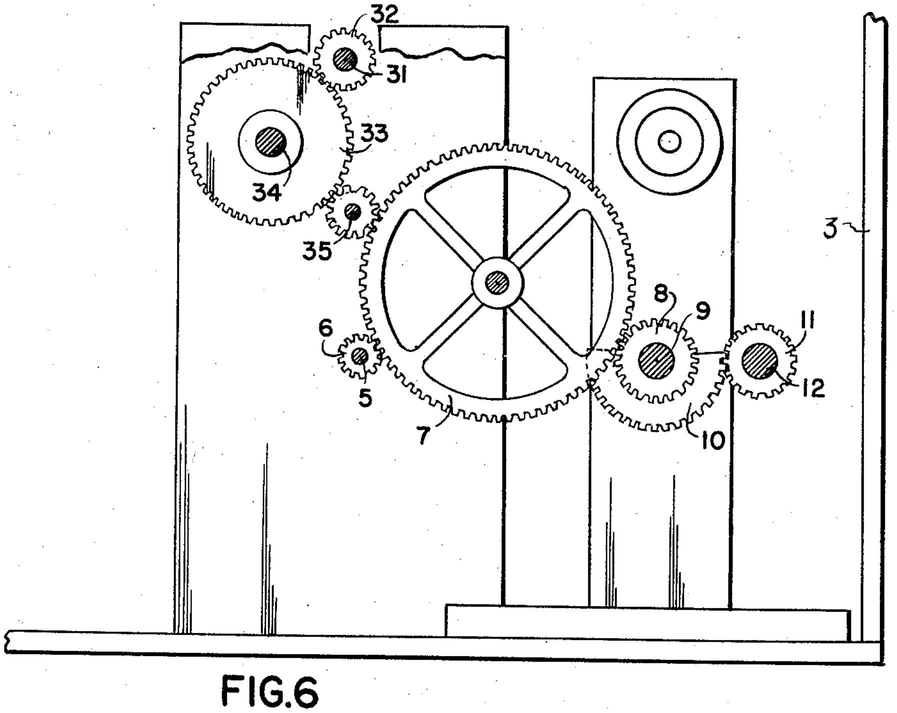
Fig. 6 is a section along the lines 6—6 of Fig. 3.
Figure 8:
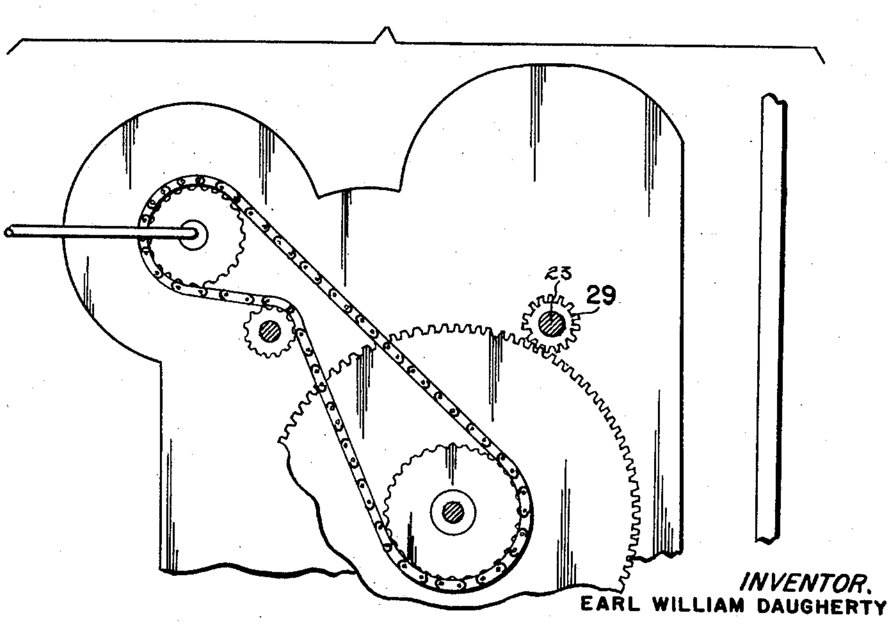
Fig. 8 is a section along the lines 8—8 of Fig. 3.

In Fig. 9 the helix curve is clearly shown as being not actually a true helix. Its curve is preferably varied in order to accommodate the varied rate of speed. The teeth 26 which pass through the helix 27 do not leave the latter until after the gears have become meshed and the gears do not go out of mesh until such time as the tooth 26 has entered the helix 27, so that a positive interlocking drive on the shaft 12 powering the shutters 15 and 17 and the pull-down mechanism 24 is present at all times, in order to avoid any possibility to lose the proper relationship in the drive.

The second helical gear is mounted on the shaft 23 the end of which carries a gear 29 which meshes with a gear of the camera of conventional structure, which is not part of the present invention and does not require any detailed description. It should be noted, however, that the film tracking mechanism of the camera is thus not subjected to the speed variation imposed upon the shutters 15 and 17 and the pull-down mechanism 24 and runs at a constant speed of twenty-four frames per second. This arrangement permits an even linear speed of the film past the sound recording galvanometer so that distortion of the sound track is avoided. The variation in speed at the camera gate is taken up by the film loops so that the synchronization of sound and picture is not destroyed.

An induction helper drive motor 30 is also mounted in the housing 3, the shaft 31 of which carries a pinion gear 32. The pinion gear 32 meshes with an idler gear 33 mounted on a shaft 34, which idler gear 33 meshes with a gear 35 which also meshes with the idler gear 7.

The induction helper drive motor 30 serves the purpose to slow down and to speed up, respectively. The drive created by the synchronous motor 4, powering the camera, which is constructed in such manner that the motor case 36 together with its electrical coils (not shown) may be rotated in the motor mount in order to provide the possibility of changing the position of the synchronizing points in relation to the camera mechanism while the camera is operating. The operator, while looking through the viewer 19 containing the shutter 17, running synchronously with the film shutter 17, can perceive visually the position of the camera mechanism as synchronized with the scanning beam on the cathode-ray tube. If the film shutter 17 is opening at any point other than the starting point of the scanner on the cathode-ray tube, a "shutter bar" will appear across the picture in the viewer. By rotating the motor case 36 of the synchronous motor 4, this bar can be made to travel either towards the top or the bottom of the picture until it disappears. At this point the camera is in perfect synchronization with the scan beam and no shutter bar or video splice will appear in the recorded picture. This synchronous operation will then continue as long as the power of the motor 4 is not interrupted and the transmitter of the signal is recorded and also as long as the camera motor is operated by current of exactly the same number of cycles per second as used for the transmitter of the video signals.

If, however, the transmitted signal is generated by a power source not interlocked with the source powering the recording equipment and, therefore, may vary slightly in cycles per second, an amplifier may be provided which furnishes current for the camera motor. The amplifier uses the vertical deflection signal from the monitor and converts it to a sine wave of 115 volts A.C., thus furnishing power to the motor 4 at the same cycle rate as the source powering the transmitter of the signal to be recorded.

This expedient solves one of the major problems of all presently used methods of recording television signals on film, which depend primarily upon the extreme fineness and accuracy of the shutter or blanking system, which problems reside due to the variation of the cycle rate of the power source powering the transmitter and that of the power source powering the recording camera. It is quite apparent that where the elimination of video splice or the appearance of a shutter bar is dependent upon the accuracy of the shutter system, that this accuracy will be completely destroyed if the cycle rate of the power supplying the transmitter differs in even a small degree from that supplying the camera mechanism. This applies the same to the present system and to the above described mechanism, even though such excessive accuracy on the part of the shutter system is not required. If, however, a differential between the signal rate of the power source for the transmitter and the cycle rate of the motor powering the camera exists, the frame rate of the film of the camera will not coincide with the frame rate of the television transmitter and, consequently, will drive out of phase, thus causing a video splice or shutter bar to appear in the picture.

This problem may not occur where the recording equipment is located at or near the transmitter and a common source of sixty cycle power supply for both, namely for the transmitter and for the recording equipment is used. In the case, however, where a signal for the recording originates, for instance from a ship at sea or from a distant land based transmitter using a power source from the public utility system which is not a part of an interlocking network with the generators furnishing the current from which the recording equipment is powered, some discrepancy between the cycle rate on the one hand on the transmitter and on the other hand on the recording equipment is bound to appear.

In order to eliminate such discrepancy, in accordance with the present invention a signal is taken from the vertical deflection coil of the monitor and passed into an amplifying unit. This vertical deflection signal originates from the transmitter and is a part of the composite signal containing video and synchronization signals from the transmitter. Amplification of this vertical deflection signal will be an exact duplicate as to the cycle rate of the power source supplying the transmitter. When this amplified signal is used to power the synchronous motor of the recording camera mechanism, the effect will be the same as if the transmitter and the recording camera mechanism were hooked up on the same source of power supply. The vertical deflection signal as taken from the monitor is a saw tooth wave form and for best results in powering the camera motor 4 must be reshaped by the amplifier to nearly form a sine wave and be amplified to the voltage and amperage requirements of the motor. For satisfactory results an impedance matching transformer is preferably included to make a complete impedance match with the motor.

In order to keep the size and weight of the amplifier of the vertical deflection signal as small as possible, the above described induction helper drive motor 30 is injected into the drive system in the following manner. The induction helper drive motor 30 is interlocked in the above described gear train with the synchronous motor 4 and the number of teeth of the pinion gear of this induction helper drive motor 30 is selected so that it will attempt to override the fixed speed of the synchronous motor 4. Since the latter will resist being driven faster than its built-in rate of speed of preferably 1800 r.p.m., it will utilize all the power of the induction helper drive motor 30 up to 1800 r.p.m. as governed by the cycle rate of the vertical deflection signal from which its power originates, but hold back the induction helper drive motor 30 from exceeding this speed. It has been found that, for example, a synchronous motor having $\frac{1}{20}$ horsepower coupled with an induction motor having $\frac{1}{25}$ horsepower operated satisfactorily, without limiting it to this relation.

Figure 10:
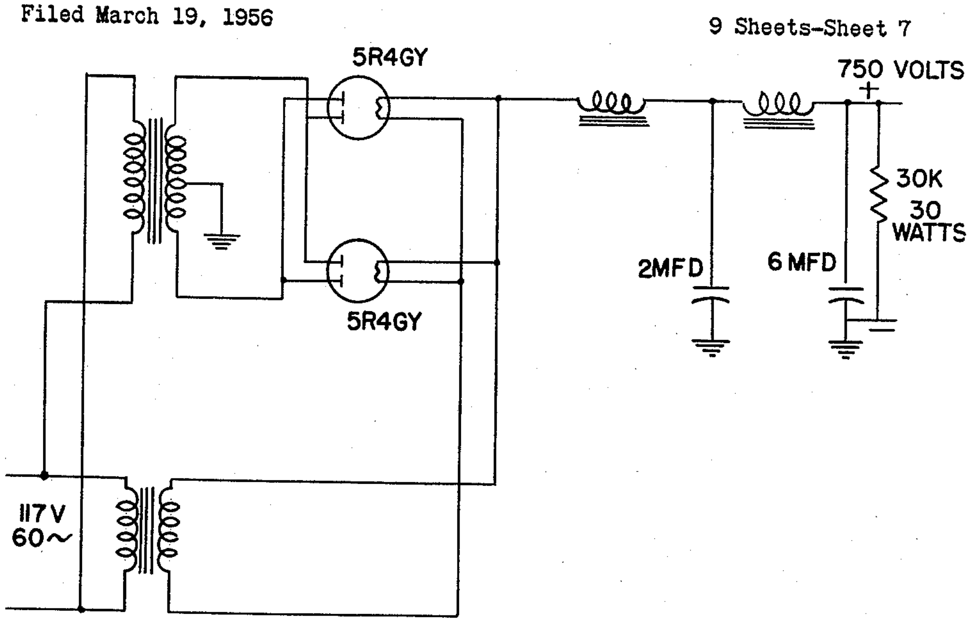
Fig. 10 is a schematic diagram of the amplifier power supply.
Figure 12:
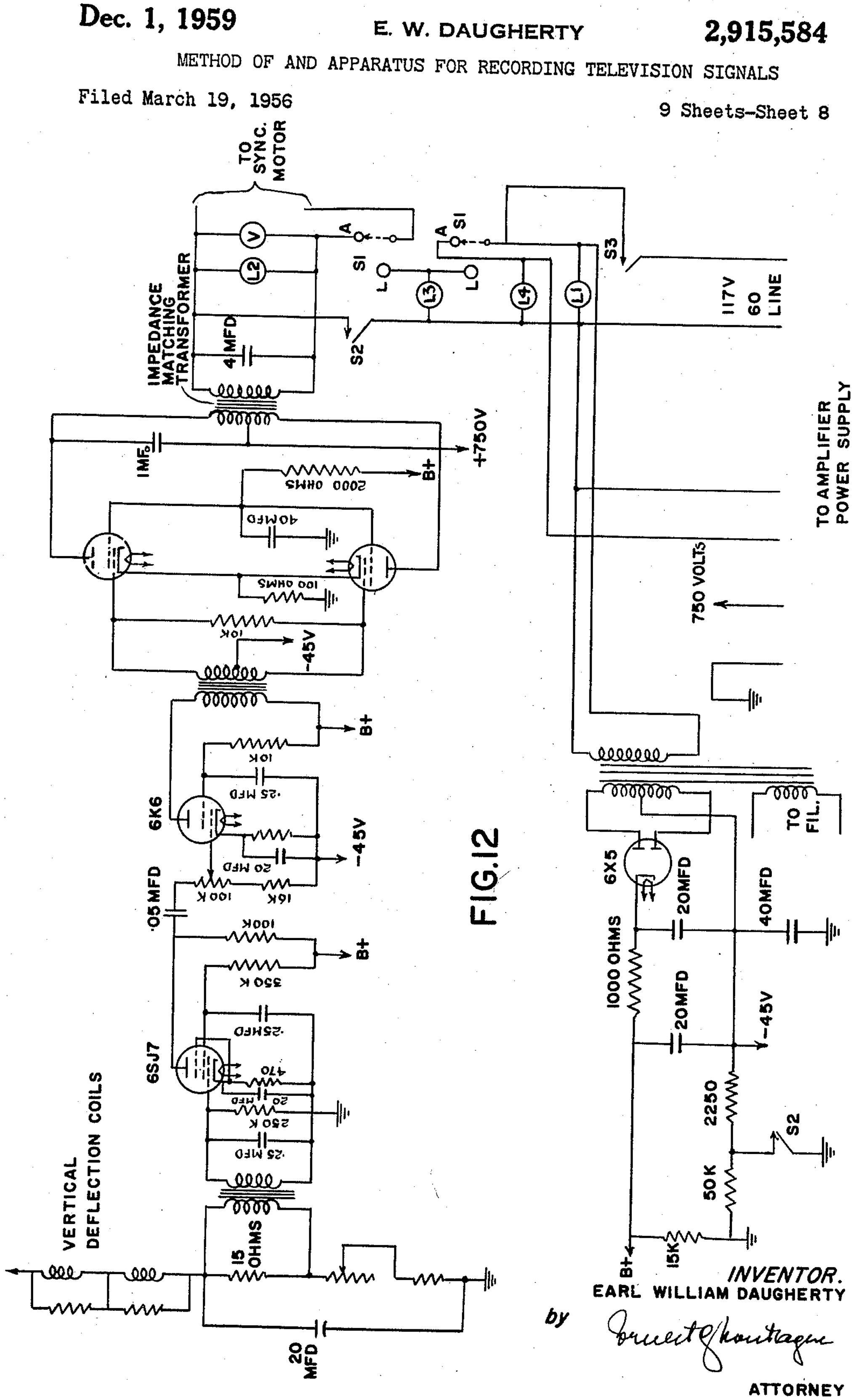
Fig. 12 is a schematic diagram indicating the operation of the camera motor.

This arrangement cuts the power requirements from the vertical deflection amplifier almost in half, since the induction motor can be powered directly from the line of the local generating system available at the location of the recording equipment. The just described method is of particular increased importance where it may be desirable to locate the recording equipment on waterborne or air-borne platforms and the generating equipment available for the necessary power may vary from the fineness of control expected of larger and more elaborate land based generating sources. A general outline indicating the amplifier power supply and the use of the vertical deflection signals is shown in the diagrams in Figs. 10 and 12 of the drawings.

Figure 11:
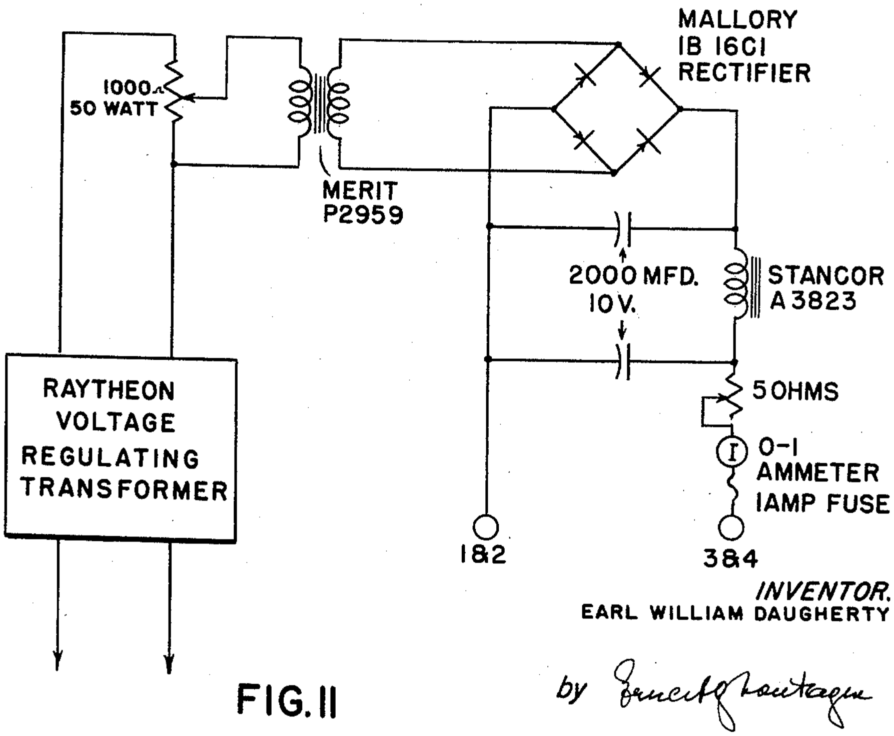
Fig. 11 is a schematic diagram of the film gamma control power supply.

It has been found beneficial for the results obtained in the film recordings to expose the film to an even, filtered light just immediately before the film is exposed to the camera lens. The light is furnished by an incandescent lamp 37 (Fig. 7) which is illuminated by direct current furnished from a rectifier. It is of greatest importance that practically no ripple remains after rectification, so that the light will be of an even intensity. The amperage of the D.C. power for the illumination must be very finely controlled and a precise meter for measuring the current supplied to the lamp must be provided. The purpose of the lamp unit is to provide a gamma control as applied to the film directly and by these means the recorded product produced on the film can be made to have the gray scale and gamma characteristics most suitable for the purpose for which the recording is desired. It is important that the film is exposed to the gamma control light just immediately preceding of its entering the film gate in order to minimize fall-out characteristics which would tend to make the results unpredictable and unreliable. The passing of the light through a green filter 38 before reaching the film greatly increases the control of effect by flattening out the response of the film to small current fluctuations. It is preferable to provide a good, accurate voltage regulator for the rectifier unit in order to bring about best results. A circuit diagram indicating such film gamma control power supply is clearly shown in Fig. 11 of the drawings.

Figure 13:
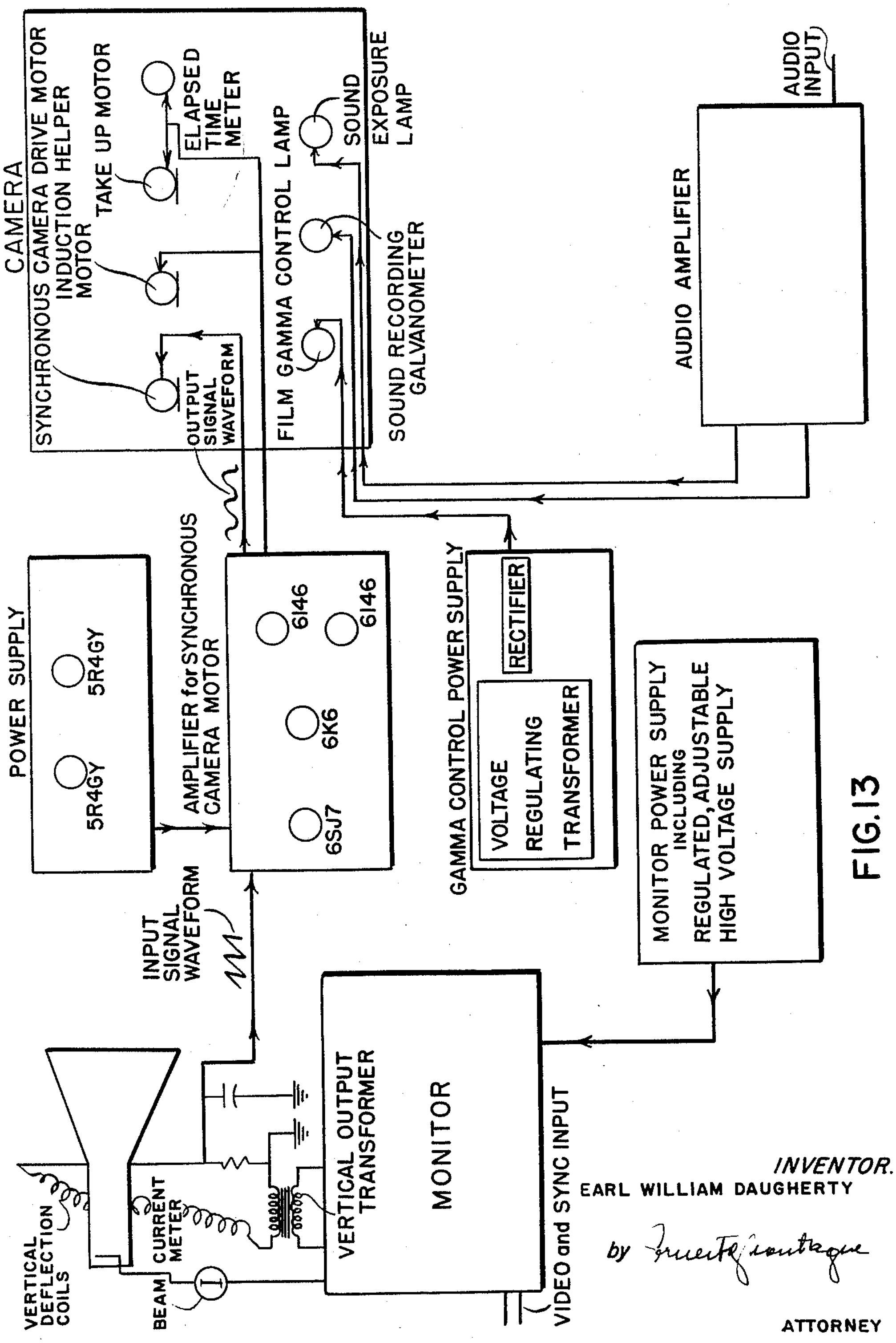
Fig. 13 is a schematic showing of the entire television recording equipment.

While any suitable variations may be made in the electrical circuit connection between the cathode-ray tube and the camera recording unit, as well as in the power supply for the latter, the audio amplifier and the gamma control power supply, Fig. 13 shows by example a schematic arrangement for indicating the connection between the respective elements of the entire recorder.

While I have disclosed one embodiment of the present invention, it is to be understood that this embodiment is given by example only and not in a limiting sense, the scope of the present invention being determined by the objects and the claims.

I claim:

1. A synchronizing and phasing system for a television recorder comprising a television receiver including a cathode-ray tube for the display of the received television images on the screen thereof and a motion picture camera including an intermittent actuating a sensitized film strip, means for projecting said received television images on said film strip, and shutter means blanking said film strip alternately for periods of one "scan unit" and two "scan units," respectively, and exposing said film strip for equal periods of 1/60 of a second equal with one "scan unit," said "scan unit" being defined as a scan in interlaced scansion and a frame in non-interlaced scansion.

2. A synchronizing and phasing system for a television recorder comprising a television receiver including a cathode-ray tube for the display of the received television images on the screen thereof and a motion picture camera including an intermittent actuating a sensitized film strip, means for projecting said received television images on said film strip, and shutter means blanking said film strip alternately for periods of a full television frame and of a full television scan, respectively, and exposing said film strip for equal periods of a full television scan during thirty frames per second.

3. A synchronizing and phasing system for a television recorder comprising a television receiver including a cathode-ray tube for the display of the received television images on the screen thereof and a motion picture camera including an intermittent actuating a sensitized film strip, means for projecting said received television images on said film strip, and shutter means blanking said film strip alternately for periods of a television field and two television frames, respectively, and exposing said film strip for equal periods of a television frame.

4. In an apparatus for recording on motion picture film television signals of the type in which each television picture image is comprised of a "scan unit" produced on a cathode-ray tube and said images are presented at an image recurrence rate of $f$ images per second, said "scan unit" being defined as a scan in interlaced scansion and a frame in non-interlaced scansion, the combination of means defining an exposure aperture embracing a single frame of said film, film driving means for moving said film past said aperture at an average film frame rate of $n$ frames per second, $n$ being less than $f$, pull-down means coacting with said film driving means to intermittently move said film past said aperture from one frame to the next $n$ times per second during a period shorter than the duration of each of said "scan units," optical means for casting on said film in said aperture single real images of said television picture images, a movable shutter disposed before said aperture, shutter drive means coacting with said film driving means for moving said shutter in synchronism with said intermittent movement of said film to obscure said film while the same is moving and expose said film to said optical image while said film is stationary, said shutter moving means including means for slowing down alternately the normal predetermined speed of rotation of said shutter for about one-half revolution thereof to substantially one-half of said normal speed and to resume again said normal speed for substantially one and one-half revolutions thereof, said alternate speed of said shutter combined with the blanking portion of said shutter exposing each frame of said film for an exposure time substantially equal to the duration of each of said "scan units" and blanking said film alternately for a time substantially equal to the duration of one "scan unit" and of two "scan units," respectively.

5. In an apparatus for recording on motion picture film television signals of the type in which each television picture image is comprised of two scans of equal duration produced on a cathode-ray tube and said images are presented at an image recurrence rate of $f$ images per second, the combination of means defining an exposure aperture embracing a single frame of said film, film driving means for moving said film past said aperture at an average film frame rate of $n$ frames per second, $n$ being less than $f$, pull-down means coacting with said film driving means to intermittently move said film past said aperture from one frame to the next $n$ times per second during a period shorter than the duration of each of said scans, optical means for casting on said film in said aperture single real images of said television picture images, a movable shutter disposed before said aperture, shutter drive means coacting with said film driving means for moving said shutter in synchronism with said intermittent movement of said film to obscure said film while the same is moving and expose said film to said optical image while said film is stationary, said shutter moving means including means for slowing down alternately the normal predetermined speed of rotation of said shutter for about one-half revolution thereto to substantially one-half of said normal speed and to resume again said normal speed for substantially one and one-half revolutions thereof, said alternate speed of said shutter combined with the blanking portion of said shutter exposing each frame of said film for an exposure time substantially equal to the duration of each of said scans and blanking said film alternately for a time substantially equal to the duration of each of said scans and of two said scans, respectively.

6. In an apparatus for recording on motion picture film television signals of the type in which each television picture image is comprised of a frame produced on a cathode-ray tube and said images are presented at an image recurrence rate of $f$ images per second, the combination of means defining an exposure aperture embracing a single frame of said film, film driving means for moving said film past said aperture at an average film frame rate of $n$ frames per second, $n$ being less than $f$, pull-down means coacting with said film driving means to intermittently move said film past said aperture from one frame to the next $n$ times per second during a period shorter than the duration of each of said frames, optical means for casting on said film in said aperture single real images of said television picture images, a movable shutter disposed before said aperture, shutter drive means coacting with said film driving means for moving said shutter in synchronism with said intermittent movement of said film to obscure said film while the same is moving and expose said film to said optical image while said film is stationary, said shutter moving means including means for slowing down alternately the normal predetermined speed of rotation of said shutter for about one-half revolution thereof to substantially one-half of said normal speed and to resume again said normal speed for substantially one and one-half revolutions thereof, said alternate speed of said shutter combined with the blanking portion of said shutter exposing each frame of said film for an exposure time substantially equal to the duration of each of said frames and blanking said film alternately for a time substantially equal to the duration of each of said frames and of two of said frames, respectively.

7. The apparatus, as set forth in claim 4, in which said cathode-ray tube has a layer of phosphor of such persistence characteristics that its maximum brilliance is reduced to at least seven per cent of said maximum brilliance within a period of one sixtieth of a second.

8. The apparatus, as set forth in claim 4, which includes circuit means comprising means for producing a saw tooth wave of alternating current of 24 cycles per second and amplification means, and means for applying said alternating current after amplification to said cathode-ray tube.

9. The apparatus, as set forth in claim 4, in which said film driving means comprises a synchronous motor having electrical coils and a motor mount, and means for rotating said electrical coils in said motor mount in order to change the position of the synchronizing points in relation to said film driving means.

10. The apparatus, as set forth in claim 9, which includes circuit means connected to receive television synchronizing pulses from a transmitter, the latter including vertical deflection signals, an amplifying unit receiving said vertical deflection signals, and said synchronous motor being fed from said amplifying unit with said amplified vertical deflection signals at a cycle rate identical with that of the power source supplying said transmitter.

11. The apparatus, as set forth in claim 4, in which said means for slowing down the shutter speed at predetermined intervals comprises a drum of substantially hourglass shape mounted on a driven shaft which carries said shutter, said drum having a helical groove, a gear having two teeth disposed 180° apart, said teeth engaging said helical groove at periodical intervals in order to slow down the speed of said drum during the engagement periods.

12. The apparatus, as set forth in claim 4, which includes preliminary illumination means prior to the exposure of said motion picture film, said illumination means comprising an incandescent bulb fed from a direct current source and of even intensity in order to provide a gamma control for said motion picture film.

References Cited in the file of this patent

UNITED STATES PATENTS

| | | |
|---|---|---|
| 2,251,786 | Epstein | Aug. 5, 1941 |
| 2,329,624 | Kellogg | Sept. 14, 1943 |
| 2,482,814 | Urbach | Sept. 27, 1949 |
| 2,565,366 | Gray | Aug. 21, 1951 |
| 2,677,012 | Bach | Apr. 27, 1954 |

UNITED STATES PATENT OFFICE

CERTIFICATE OF CORRECTION

December 1, 1959

Patent No. 2,915,584

Earl William Daugherty

It is hereby certified that error appears in the printed specification of the above numbered patent requiring correction and that the said Letters Patent should read as corrected below.

Column 13, line 9, claim 7, for "one sixtieth of a second" read -- one thirtieth of a second --.

Signed and sealed this 23rd day of August 1960.

(SEAL)
Attest:

KARL H. AXLINE
Attesting Officer

ROBERT C. WATSON
Commissioner of Patents